Dec. 26, 1939.  A. TROSCH  2,184,608

PLANER

Filed Nov. 30, 1938

Inventor,
ALFRED TROSCH,
By Clyde L. Rogers
his Attorney,

Patented Dec. 26, 1939

2,184,608

UNITED STATES PATENT OFFICE 2,184,608

PLANER

Alfred Trosch, Rochester, N. Y., assignor to Consolidated Machine Tool Corporation, Rochester, N. Y., a corporation of New York Application November 30, 1938, Serial No. 243,264

4 Claims. (Cl. 90—34)

This invention relates to planers and more particularly to a planer type embodying a reciprocating table with a rack drive from beneath the table comprising a rack fixed to the table with a driving gear or "bull wheel" engaged with the rack and receiving motion from the speed reducing gear train, and with suitable reversing means.

In heavy duty planers of this type, it has been somewhat usual heretofore to provide in addition to the slide ways or supports at the sides of the table an additional supporting way at, or adjacent to, the transverse center of the table, with plural racks, one located at each side of such central slide way, so as to better transmit the necessary power for heavy duty work. Such an arrangement transmits the driving power equally to both sides of the table, but in practice by far the greater part of the work is performed by a tool or tools located at one side only of the table. A prime object of the present invention is to better coordinate the driving power with the work being done by providing a single relatively heavy rack and bull wheel engaging therewith located adjacent the side of the planer table where the major part of the work of the planer is performed.

The foregoing and other objects and advantages of the invention will be better understood from the following detailed description, taken in connection with the accompanying drawing, and the distinctive features of novelty will be thereafter pointed out in the appended claims.

Referring to the drawing.

Figure 5:
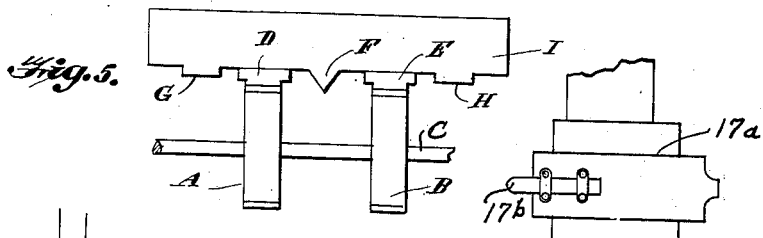
Figure 5 is a diagrammatic end view illustrating a known or conventional type of planer drive.
Figure 1:
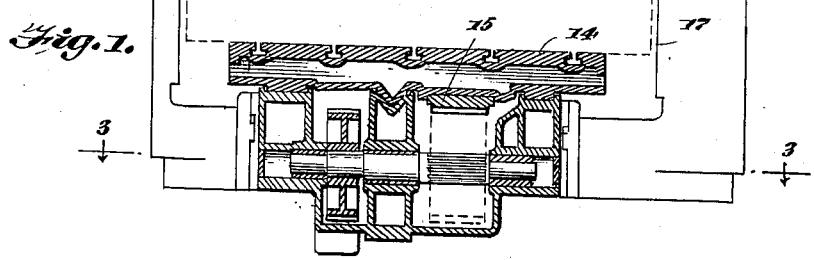
Figure 1 is a transverse section through the table and base of a planer embodying the invention, this section being approximately on line 1—1 of Figure 2.
Figure 2:
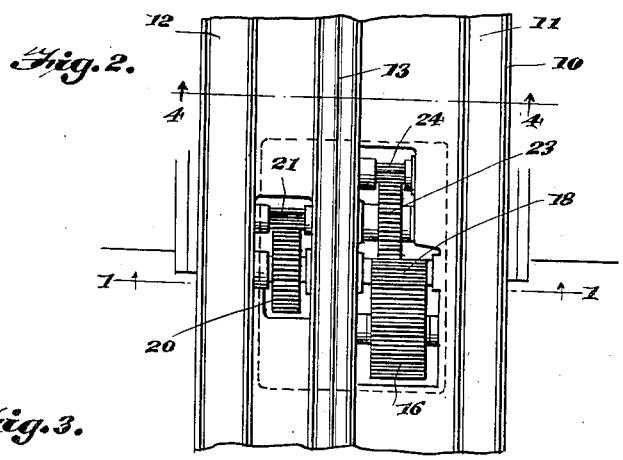
Figure 2 is a plan view of the planer base with the reciprocating table removed.
Figures 3, 4:
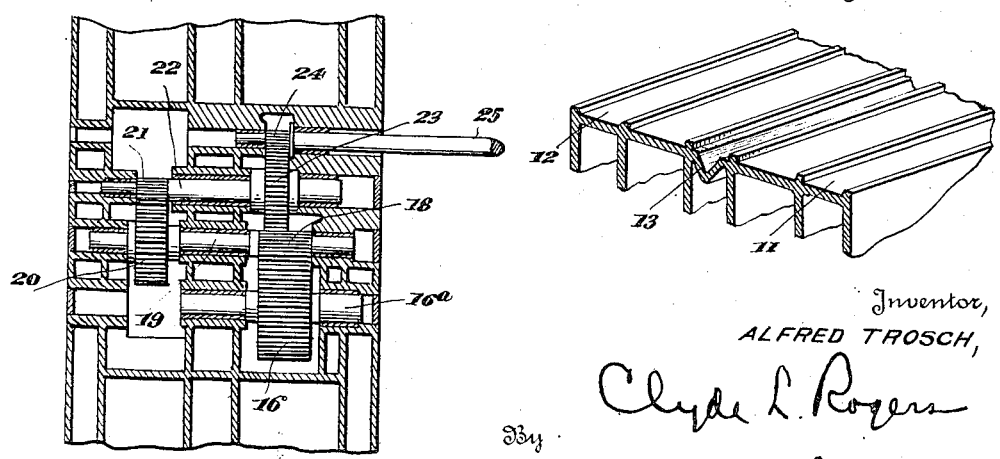
Figure 3 is a horizontal section on line 3—3 of Figure 1.
Figure 4 is a fragmentary perspective and section on line 4—4 of Figure 2 showing a portion of the planer base with its slide ways.

10 indicates the planer base, shown as equipped with flat slide ways 11, 12 at each side thereof and a central V-shaped slide way 13. 14 denotes the planer table fitted to slide on said ways. In accordance with my invention this table has fixed to the under side thereof a relatively wide and heavy rack 15 located between the central slide way 13 and one of the side slide ways 11, being thus relatively close to the vertically extending tool carrying upright 17 at one side of the planer; a tool head slidably fitted on his upright is indicated conventionally at 17a, bearing a planing tool 17b. This rack is engaged by a relatively wide and heavy bull wheel, or gear 16 mounted on short shafts 16a journaled in the base. The gear or bull wheel 16 is engaged and driven by a small pinion 18 fixed on a shaft 19, journaled in, and extending across the base and having fixed adjacent its other end a gear 20. The gear 20 is engaged and driven by a small pinion 21 fixed to one end of a shaft 22 journaled in the base and having fixed near its other end a gear 23. The gear 23 is engaged and driven by a small pinion 24 fixed at one end of a shaft 25, journaled in the base and extending outward therefrom with connections to be driven by a suitable motor including the requisite reversing means (not shown). It will be understood that the width of the bull wheel 16 and the rack 15 are approximately equal to that of both bull wheels A and B of the conventional form of heavy duty planers shown in Figure 5, where these bull wheels are shown as fixed on a shaft C and engaged with racks D, E spaced at opposite sides of the central slide way F, and between such central slide way and the ways G, H, adjacent each side of the bed I. Thus the requisite power impulse is transmitted to the table 14 as closely as possible to the working area where the major portion of the work of the planer is to be performed, i. e. adjacent the upright or housing 17 which either has the tool head adjustable thereon, or supports the cross rail which bears the tool head or heads. The described construction and arrangement also provides the most effective co-ordination between the driving bull wheel and rack, and the slide ways on which the table operates, since the relatively wide rack is located between the central V-way of the table and the slide way at one side thereof. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having now described my invention, what I claim as new and desire to secure by Letters Patent is:

1. A planer comprising a reciprocating table, means for mounting a planing tool adjacent one side of said table, a relatively wide and heavy rack and gear meshing therewith located adjacent the side of the table where said tool is mounted and constituting the sole power transmission means to said table, and speed reducing gearing leading to the wide gear that meshes with said rack.

2. A planer comprising a reciprocating table, an upright at one side thereof, a tool bearing head fitted on said upright, a relatively wide and heavy rack and gear meshing with said rack, said rack located adjacent the side of said table next to said upright and constituting the sole power transmission means, and speed reducing gearing leading to the wide gear that meshes with said rack.

3. A planer comprising a reciprocation table operable on slide ways adjacent each side thereof and also on an intermediate slide way, an upright at one side thereof, a tool bearing head fitted on said upright, a relatively wide rack borne by the table between said intermediate slide way and the one of said side slide ways adjacent said upright, a correspondingly wide gear meshing with said rack and constituting the sole means of transmitting power to the table, and speed reducing gearing leading from a prime drive source to said wide gear.

4. A planer comprising a reciprocating table operable on slide ways adjacent each side thereof and also on an intermediate slide way, an upright at one side thereof, a tool bearing head fitted on said upright, and means for transmitting motive power to said table between said intermediate slide way and the one of said side slide ways next to said upright, and adjacent the side of the planer where the major portion of the work is to be performed.

ALFRED TROSCH.